Patented Oct. 16, 1951

2,571,683

UNITED STATES PATENT OFFICE 2,571,683

MIXTURES COMPRISING POLYACRYLONITRILE AND A POLYVINYL ACETAL

Harry W. Coover, Jr., Kingsport, Tenn., and Joseph B. Dickey, Rochester, N. Y., assignors to Eastman Kodak Company, Rochester, N. Y., a corporation of New Jersey No Drawing. Application April 13, 1950, Serial No. 155,792

14 Claims. (Cl. 260—45.5)

This invention relates to polymer compositions and to articles prepared therefrom.

Acrylonitrile has previously been used in the preparation of various polymers which are characterized by insolubility, or very low solubility, in many of the usual organic solvents. Many of these polymers, especially those containing high percentages of acrylonitrile, are further characterized by their lack of susceptibility to organic dyes, it being well known that fibers spun from polyacrylonitrile solutions can be passed through dye baths without material amounts of the dye adhering to the fiber.

Attempts have been made to increase the dyeability of polyacrylonitrile fibers by interpolymerizing acrylonitrile with certain monomers whose polymers have an affinity for dyes. While this procedure does give polymer products from which fibers having good dyeing properties can be obtained, a serious drawback arises in certain instances due to a substantial lowering of the softening point of the fiber. For example, while an interpolymer of acrylonitrile and acrylic acid containing about 80 per cent by weight of acrylonitrile and 20 per cent by weight of acrylic acid in the polymer molecule, can be drawn into fibers readily susceptible to dyes, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dye-susceptible. This procedure likewise provides fibers having good dyeing properties, however, many of these fibers show a low softening point, and in addition many show segmentation into their individual components along their horizontal axis. For example, fibers spun from solutions of mixtures of polyacrylonitrile and polyvinyl acetate, are too low in softening temperature to be of practical value, and also are subject to the defect of segmentation. This is not surprising because it is generally known that polyacrylonitrile is not compatible with many organic (or inorganic) substances.

We have now found new resinous compositions which provide fibers having higher softening points than the interpolymers referred to above, and which do not exhibit the segmentation defect shown by many of the fibers prepared from certain prior art polymer mixtures comprising polyacrylonitrile.

It is, therefore, an object to provide polymer mixtures comprising polyacrylonitrile.

A further object is to provide homogeneous solutions of these polymer mixtures comprising polyacrylonitrile.

Still another object is to provide fibers obtained from these homogeneous solutions of these polymer mixtures. Other objects will become apparent from a consideration of the following description and examples.

According to our invention, we provide polymer mixtures comprising from 60 to 90 per cent by weight of polyacrylonitrile (i. e. a homopolymer of acrylonitrile) and from 40 to 10 per cent by weight of a polyvinyl acetal. Quite unexpectedly we have found that polymeric compositions having the above range of composition are excellently adaptable for the spinning of fibers in that they have a high softening point, and provide fibrous products showing no perceptible segmentation.

The polyvinyl acetals useful in practicing our invention contain from 1 to 5 per cent by weight of polyvinyl acetate units and from 10 to 50 per cent by weight of polyvinyl alcohol units, the remainder being polyvinyl acetal units. Polyvinyl acetals containing less than about 10 per cent by weight of polyvinyl alcohol units do not provide compositions whose fibers exhibit the unique dyeing characteristics mentioned above, while polyvinyl acetals containing more than about 50 per cent by weight of polyvinyl alcohol units provide compositions whose fibers lose too high a percentage of the acetal on washing to be of practical value.

Polyvinyl acetals useful in practicing our invention include polyvinyl formal, polyvinyl acetaldehyde acetal, polyvinyl propional, polyvinyl n-butyral, polyvinyl isobutyral, etc. e. g. polyvinyl acetals of aldehydes containing from 1 to 4 carbon atoms). Other polyvinyl acetals which can be used in practicing our invention include polyvinyl benzal, polyvinyl chlorobenzals (o- and p-chlorobenzals, for example), polyvinyl toluals (o- and p-toluals, for example), etc. (e. g. a polyvinyl acetal of an aldehyde of the benzene series). Especially useful compositions comprise those containing from 70 to 85 per cent by weight of polyacrylonitrile and from 30 to 15 per cent by weight of one of the above acetals. These compositions provide fibers showing excellent dyeing properties and high softening points.

The polyacrylonitrile and polyvinyl acetal resins can be mixed together by any of several methods. The two ingredients can be mixed together in a suitable mixer, such as a ball mill, or they can be dissolved in a mutual solvent (which is known to dissolve polyacrylonitrile), such as N,N - dimethylformamide, N,N - dimethylacetamide, ethylene carbonate, ethylene carbamate, N-methyl-2-pyrrolidone, γ-butyrolactone, etc. The ingredients can be mixed together before addition to the solvent, or each ingredient can be added separately to the solvent. Again, the ingredients can be added to the solvent to produce a slurry, or dispersion, which is agitated and heated to effect solution. The solubility of the resins in the solvents can be improved by incorporating a small amount of certain acids, such as sulfuric acid, phosphoric acid, oxalic acid, etc. as has been described in U. S. Patents 2,503,244 and 2,503,245, both issued April 11, 1950, of H. W. Coover, Jr., T. E. Stanin, and Joseph B. Dickey. The concentration of solids in the solvents can be varied, depending on the use to which the composition is to be put; however, for most purposes it has been found that from about 10 to 40 per cent by weight of solids is adequate.

The following examples illustrate methods for utilizing the new compositions of our invention.

*Example 1*

18 g. of a mixture containing 20 per cent by weight of polyvinyl acetaldehyde acetal (2.4 per cent polyvinyl acetate, 12.9 per cent polyvinyl alcohol, and 84.7 per cent polyvinyl acetaldehyde acetal) and 80 per cent by weight of polyacrylonitrile were dissolved in 82 g. of N,N-dimethylformamide, and the solution was filtered under pressure into a stainless steel chamber, which had a single-hole spinneret measuring 0.1 mm. in diameter, extending horizontally from the bottom of the chamber in such a manner that upon extrusion, the filament would emerge at a right angle to the chamber. The chamber was then closed, and the top thereof which was connected to a source of nitrogen gas opened to this gas supply, while a pressure of about 25 pounds per square inch was applied. Upon application of this pressure, the solution was extruded into a shallow bath 6 feet in length, which was placed at a right angle to the chamber, and contained water. The filament coagulated upon coming into contact with the water and was then taken up on a roller having a peripheral speed of 16 feet per minute. The filament passed from this roller through a hot air chamber heated at 170°–200° C. and onto a wind-up drum one meter in circumference, which was rotating at a surface speed of 59.2 feet per minute. After the drum had made 50 revolutions an automatically controlled guide was shifted one inch to an adjacent position on the drum and the drum was allowed to make another 50 revolutions. This was continued until several such 50-filament bundles were obtained. These were cut from the drum and the bundles containing 50 filaments, each measuring one meter in length, were separately twisted to obtain several one meter lengths of yarn. The samples thus produced had a tenacity of 2.3 grams per denier, an extensibility of 10 per cent, and shrank 10 per cent in boiling water.

*Example 2*

In a manner similar to that described in Example 1 above, a N,N-dimethylformamide solution of a mixture containing 20 per cent by weight of polyvinyl n-butyral (2.1 per cent by weight polyvinyl acetate, 8.2 per cent polyvinyl alcohol, and 89.7 per cent polyvinyl n-butyral) and 80 per cent of polyacrylonitrile was spun into fibers one meter in length. They had a tenacity of 3.3 grams per denier, an extensibility of 11 per cent, and shrank 9 per cent in boiling water.

*Example 3*

In a manner similar to that described in Example 1 above, a N,N-dimethylformamide solution of a mixture containing 10 per cent by weight of polyvinyl acetaldehyde acetal (2.8 per cent polyvinyl acetate, 4.7 per cent polyvinyl alcohol, and 92.5 per cent polyvinyl acetaldehyde acetal) and 90 per cent by weight of polyacrylonitrile was spun into fibers one meter in length. They had a tenacity of 3.9 grams per denier, an extensibility of 18 per cent, and shrank 7 per cent in boiling water.

*Example 4*

In a manner similar to that described in Example 1 above, a N,N-dimethylformamide solution of a mixture containing 40 per cent by weight of polyvinyl benzal (2.2 per cent by weight polyvinyl acetate, 8.6 per cent polyvinyl alcohol, and 89.2 per cent polyvinyl benzal) and 60 per cent of polyacrylonitrile was spun into fibers one meter in length. They had a tenacity of 2.4 grams per denier, an extensibility of 10 per cent, and shrank 12 per cent in boiling water.

*Example 5*

In a manner similar to that described in Example 1 above, a N,N-dimethylformamide solution of a mixture containing 25 per cent by weight of polyvinyl acetaldehyde acetal (1.5 per cent polyvinyl acetate, 15.6 per cent polyvinyl alcohol and 82.9 per cent polyvinyl acetaldehyde acetal) and 75 per cent by weight of polyacrylonitrile was spun into fibers one meter in length. They had a tenacity of 3.4 grams per denier, an extensibility of 12 per cent and shrank only 11 per cent in boiling water.

*Example 6*

In a manner similar to that described in Example 1 above, a N,N-dimethylformamide solution of a mixture containing 30 per cent by weight of polyvinyl formal (4.2 per cent polyvinyl acetate, 2.8 polyvinyl alcohol, and 93 per cent polyvinyl formal) and 70 per cent by weight of acrylonitrile was spun into fibers one meter in length. They had a tenacity of 3.2 grams per denier, and extensibility of 15 per cent, and shrank 9 per cent in boiling water.

*Example 7*

In a manner similar to that shown in Example 1 above, a N,N-dimethylformamide solution of a mixture containing 15 per cent by weight of polyvinyl acetaldehyde acetal (1.3 per cent polyvinyl acetate, 47.7 per cent polyvinyl alcohol, and 51 per cent polyvinyl acetaldehyde acetal) and 85 per cent by weight of polyacrylonitrile was spun into fibers one meter in length. They had a tenacity of 3.6 grams per denier, and extensibility of 15 per cent, and shrank only 8 per cent in boiling water.

Solvents other than N,N-dimethylformamide can advantageously be used in the preparation of synthetic fibers and yarns, including those solvents which have been listed above.

The polyacrylonitrile useful in practicing our invention can be prepared according to the process described in U. S. Patent 2,434,054, dated January 6, 1948, or U. S. Patent 2,296,403, dated September 22, 1942. Other processes which can be used are described in the copending applications, Serial No. 49,651, Serial No. 49,652, and Serial No. 49,653, all filed September 16, 1948, of T. E. Stanin, H. W. Coover, Jr. and J. B. Dickey.

The polyvinyl acetals useful in our invention can be prepared as described in U. S. Patents 1,955,068, dated April 12, 1934, or Reissue 20,430, dated June 29, 1937.

The compositions of our invention are also useful in the preparation of sheets, films, tapes, etc.

What we claim and desire secured by Letters Patent of the United States is:

1. A resinous composition consisting of from 60 to 90 per cent by weight of polyacrylonitrile and from 40 to 10 per cent by weight of a polyvinyl acetal containing from 1 to 5 per cent by weight of polyvinyl acetate units and from 2 to 50 per cent by weight of polyvinyl alcohol units, the remainder being polyvinyl acetal units.

2. A resinous composition consisting of from 60 to 90 per cent by weight of polyacrylonitrile and from 40 to 10 per cent by weight of a polyvinyl acetal containing from 1 to 5 per cent by weight of polyvinyl acetate units and from 2 to 50 per cent by weight of polyvinyl alcohol units, the remainder being polyvinyl acetal units of an aldehyde containing from 1 to 4 carbon atoms.

3. A resinous composition consisting of from 60 to 90 per cent by weight of polyacrylonitrile and from 40 to 10 per cent by weight of a polyvinyl acetal containing from 1 to 5 per cent by weight of polyvinyl acetate units and from 2 to 50 per cent by weight of polyvinyl alcohol units, the remainder being polyvinyl acetal units of an aldehyde of the benzene series.

4. A resinous composition consisting of from 60 to 90 per cent by weight of polyacrylonitrile and from 40 to 10 per cent by weight of a polyvinyl acetal containing from 1 to 5 per cent by weight of polyvinyl acetate units and from 2 to 50 per cent by weight of polyvinyl alcohol units, the remainder being polyvinyl acetaldehyde acetal units.

5. A resinous composition consisting of from 60 to 90 per cent by weight of polyacrylonitrile and from 40 to 10 per cent by weight of a polyvinyl acetal containing from 1 to 5 per cent by weight of polyvinyl acetate units and from 2 to 50 per cent by weight of polyvinyl alcohol units, the remainder being polyvinyl formal units.

6. A resinous composition consisting of from 60 to 90 per cent by weight of polyacrylonitrile and from 40 to 10 per cent by weight of a polyvinyl acetal containing from 1 to 5 per cent by weight of polyvinyl acetate units and from 2 to 50 per cent by weight of polyvinyl alcohol units, the remainder being polyvinyl n-butyral units.

7. A resinous composition consisting of from 60 to 90 per cent by weight of polyacrylonitrile and from 40 to 10 per cent by weight of polyvinyl acetal containing from 1 to 5 per cent by weight of polyvinyl acetate units and from 2 to 50 per cent by weight of polyvinyl alcohol units, the remainder being polyvinyl benzacetal units.

8. A resinous composition consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl acetal units.

9. A resinous composition consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl acetal units of an aldehyde containing from 1 to 4 carbon atoms.

10. A resinous composition consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl acetal units of an aldehyde of the benzene series.

11. A resinous composition consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl acetaldehyde acetal units.

12. A resinous composition consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl formal units.

13. A resinous compostion consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl n-butyral units.

14. A resinous composition consisting of from 70 to 85 per cent by weight of polyacrylonitrile and from 30 to 15 per cent by weight of a polyvinyl acetal containing from 1 to 5 per cent by weight of polyvinyl acetate units and from 2 to 50 per cent by weight of polyvinyl alcohol units, the remainder being polyvinyl benzacetal units.

HARRY W. COOVER, JR.
JOSEPH B. DICKEY.

REFERENCES CITED

The following references are of record in the file of this patent:

UNITED STATES PATENTS

| Number | Name | Date |
|---|---|---|
| 2,404,714 | Latham | July 23, 1946 |